United States Patent
Tsutsumi et al.

(10) Patent No.: US 8,912,701 B2
(45) Date of Patent: *Dec. 16, 2014

(54) INDUCTION MOTOR, COMPRESSOR AND REFRIGERATING CYCLE APPARATUS

(71) Applicant: Mitsubishi Electric Corporation, Chiyoda-ku (JP)

(72) Inventors: Takahiro Tsutsumi, Chiyoda-ku (JP); Koji Yabe, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/796,567

(22) Filed: Mar. 12, 2013

(65) Prior Publication Data

US 2013/0186130 A1 Jul. 25, 2013

Related U.S. Application Data

(62) Division of application No. 13/233,448, filed on Sep. 15, 2011, now Pat. No. 8,723,388.

(30) Foreign Application Priority Data

Dec. 28, 2010 (JP) ................................. 2010-292271

(51) Int. Cl.
*H02K 17/16* (2006.01)
*H02K 1/06* (2006.01)
*H02K 17/20* (2006.01)
*F25B 1/00* (2006.01)
*H02K 1/14* (2006.01)
*H02K 1/26* (2006.01)
*F04C 23/00* (2006.01)
*F04C 29/00* (2006.01)
*F04C 18/356* (2006.01)

(52) U.S. Cl.
CPC ................ *H02K 1/06* (2013.01); *H02K 17/205* (2013.01); *H02K 2213/03* (2013.01); *F25B 1/00* (2013.01); *H02K 1/14* (2013.01); *H02K 1/26* (2013.01); *H02K 17/16* (2013.01); *F04C 23/008* (2013.01); *F04C 29/0085* (2013.01); *F04C 18/356* (2013.01)
USPC ......................................................... 310/211

(58) Field of Classification Search
USPC ........... 310/124–125, 166, 211–212, 216.111
See application file for complete search history.

(56) References Cited

U.S. PATENT DOCUMENTS 2,794,138 A * 5/1957 Dunn, Jr. ....................... 310/211
3,401,280 A * 9/1968 Lackey et al. ................. 310/211

(Continued)

FOREIGN PATENT DOCUMENTS

JP 14016460 U 10/1939
JP 57-71254 A 5/1982

(Continued)

OTHER PUBLICATIONS

Office Action (Notice of Reasons for Rejection) dated Oct. 23, 2012, issued in corresponding Japanese Patent Application No. 2010-292271, and an English Translation thereof, 6 pages.

(Continued)

*Primary Examiner* — Tran Nguyen
(74) *Attorney, Agent, or Firm* — Buchanan Ingersoll & Rooney PC (57) ABSTRACT

The efficiency of an induction motor is improved while suppressing the generation of magnetic flux saturation of a rotor core. In an induction motor, "a magnetic path width of a rotor" which is the product of a circumferential width of a rotor tooth formed in the rotor and the number of rotor teeth is equal to or larger than "a magnetic path width of a stator" which is the product of a circumferential width of a stator tooth formed in the stator and the number of stator teeth.

3 Claims, 7 Drawing Sheets

(56) References Cited

U.S. PATENT DOCUMENTS

| | | | |
|---|---|---|---|
| 3,684,906 A * | 8/1972 | Lenz | 310/61 |
| 4,139,790 A * | 2/1979 | Steen | 310/156.83 |
| 4,301,386 A * | 11/1981 | Schweder et al. | 310/59 |
| 4,358,697 A | 11/1982 | Liu et al. | |
| 4,499,660 A * | 2/1985 | Lenz | 29/598 |
| 4,566,179 A * | 1/1986 | Sawyer et al. | 29/596 |
| 4,782,260 A * | 11/1988 | Gandhi et al. | 310/211 |
| 5,559,419 A | 9/1996 | Jansen et al. | |
| 5,924,847 A * | 7/1999 | Scaringe et al. | 417/42 |
| 7,442,017 B2 * | 10/2008 | Tsuchiya et al. | 418/55.1 |
| 7,741,750 B1 * | 6/2010 | Tang | 310/216.004 |
| 7,868,509 B2 | 1/2011 | Yoshino et al. | |
| 8,466,597 B2 | 6/2013 | Yabe et al. | |
| 8,723,388 B2 * | 5/2014 | Tsutsumi et al. | 310/211 |
| 2009/0044548 A1 * | 2/2009 | Masoudipour et al. | 62/115 |
| 2010/0141080 A1 * | 6/2010 | Tang | 310/216.111 |

FOREIGN PATENT DOCUMENTS

| | | |
|---|---|---|
| JP | 1-129726 A | 5/1989 |
| JP | 07298582 A | 11/1995 |
| JP | 09135545 A | 5/1997 |
| JP | 09-507376 | 7/1997 |
| JP | 9-215286 A | 8/1997 |
| JP | 2002-142420 | 5/2002 |
| JP | 2003-244903 | 8/2003 |
| JP | 2006-230054 | 8/2006 |
| JP | 2006-238507 A | 9/2006 |
| WO | WO 2009-084245 A1 | 7/2009 |
| WO | WO 2009-084251 | 7/2009 |

OTHER PUBLICATIONS

Korean Office Action dated Dec. 20, 2012, with English-language translation.
Korean Office Action dated Jun. 28, 2013 issued in the corresponding Korean Patent Application No. 10-2011-0098004 and English translation(4 pages).
Notice of Reasons for Refusal issued in corresponding Japanese Patent Application No. JP2012-271462, mailed Sep. 17, 2013 and English translation thereof.
Chinese Office Action (First) dated Nov. 5, 2013, issued in corresponding Chinese Application No. 2011103083515 and an English Translation thereof. (10 pgs.).
Korean Office Action (Notification of Reason for Refusal) dated Dec. 20, 2013, issued in corresponding Korean Application No. 10-2011-0098004 and an English Translation thereof. ( 6 pgs.).
Japanese Office Action (Notice of Reasons for Rejection) dated Dec. 3, 2013, issued in corresponding Japanese Patent Application No. 2010-292271 and an English Translation thereof. (5 pgs.).
Japanese Notice of Reasons for Rejection dated Jun. 11, 2013 issued in the corresponding Japanese Patent Application No. 2010-292271 and English translation (5 pages).
Japanese Office Action issued in corresponding Japanese Application No. 2012-271462, mailed Mar. 18, 2014.
Chinese Office Action dated Jul. 11, 2014 issued in the corresponding Chinese Patent Application No. 201110308351.5 and Statement of Relevance (4 pages).
Korean Office Action dated Jun. 20, 2014 issued in the corresponding Korean Patent Application No. 10-2011-0098004 and English language translation (6 pages).

* cited by examiner

IN A CASE OF Hr/Hs=1

BOTH LEAKAGE MAGNETIC FLUX AND SHORT-CIRCUIT MAGNETIC FLUX ARE DECREASED BY PROVIDING PROJECTION ON DISTAL END OF SLOT → EFFICIENCY IS IMPROVED

REFRIGERANT FLOW DIRECTION
(AT THE TIME OF COOLING OPERATION)

INDUCTION MOTOR, COMPRESSOR AND REFRIGERATING CYCLE APPARATUS

BACKGROUND OF THE INVENTION

1. Technical Field

The present invention relates to an induction motor, a compressor and a refrigerating cycle apparatus, and more particularly to a squirrel-cage-type induction motor, a compressor which includes the induction motor and a refrigerating cycle apparatus which includes the compressor.

2. Background Art

Conventionally, with respect to a squirrel-cage-type induction motor which includes a squirrel-cage-type rotor which is formed by housing a cage-shaped winding constituted by short circuiting both ends of a plurality of rod-shaped conductors using short circuiting rings in slots of a rotor core, and a stator core provided with a winding, there has been disclosed a squirrel-cage-type induction motor in which an axial length of the rotor core is larger than an axial length of the stator core (see JP-A-9-215286 (patent document 1) (pages 3 to 4, FIG. 1), for example).

SUMMARY OF INVENTION

However, in the induction motor disclosed in patent document 1, although efficiency of the motor can be improved by decreasing secondary resistance by making rotor slots formed in the rotor large, there has been a drawback that the enlargement of the opening of rotor slots generates the magnetic flux saturation of the rotor core thus lowering the performance of the motor.

The present invention has been made to overcome the above-mentioned drawbacks, and it is an object of the present invention to improve the efficiency of an induction motor while suppressing the generation of magnetic flux saturation of a rotor core.

According to one aspect of the present invention, there is provided an induction motor which includes: a rotor which is a squirrel-cage-type secondary conductor formed by filling a nonmagnetic and conductive material in the inside of rotor slots; and a stator which surrounds the rotor and is provided with a stator core around which a winding is wound, wherein a magnetic path width of the rotor which is the product of a circumferential width of a rotor tooth formed in the rotor and the number of rotor teeth is equal to or larger than a magnetic path width of the stator which is the product of a circumferential width of a stator tooth formed in the stator and the number of stator teeth.

According to the induction motor of the present invention, by increasing the width of the tooth of the rotor and decreasing the width of the tooth of the stator, that is, by setting the core width of the rotor smaller than the core width of the stator as described above, an iron loss can be decreased thus improving the efficiency of the induction motor.

DESCRIPTION OF THE PREFERRED EMBODIMENTS

[Embodiment 1: Induction Motor]

Figure 1:
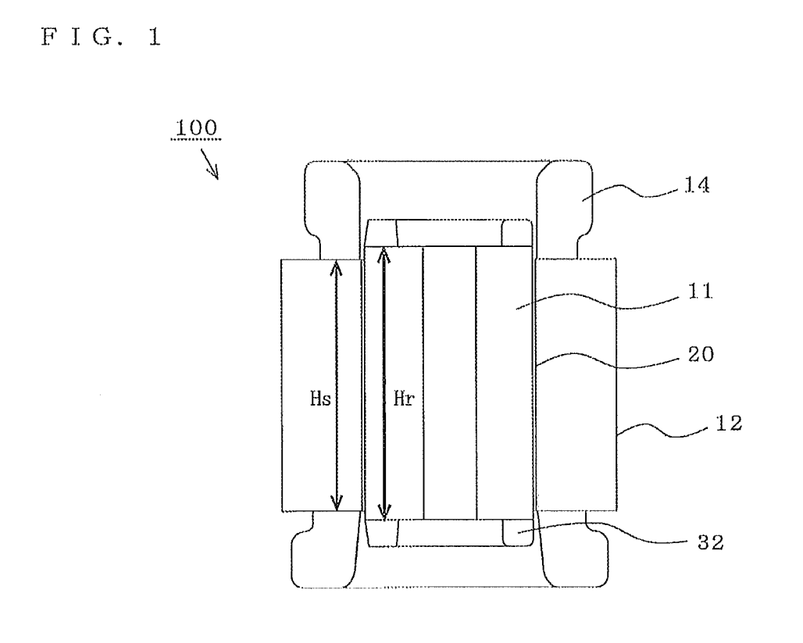
FIG. 1 is an axial cross-sectional view for explaining an induction motor according to Embodiment 1 of the present invention.
Figure 2:
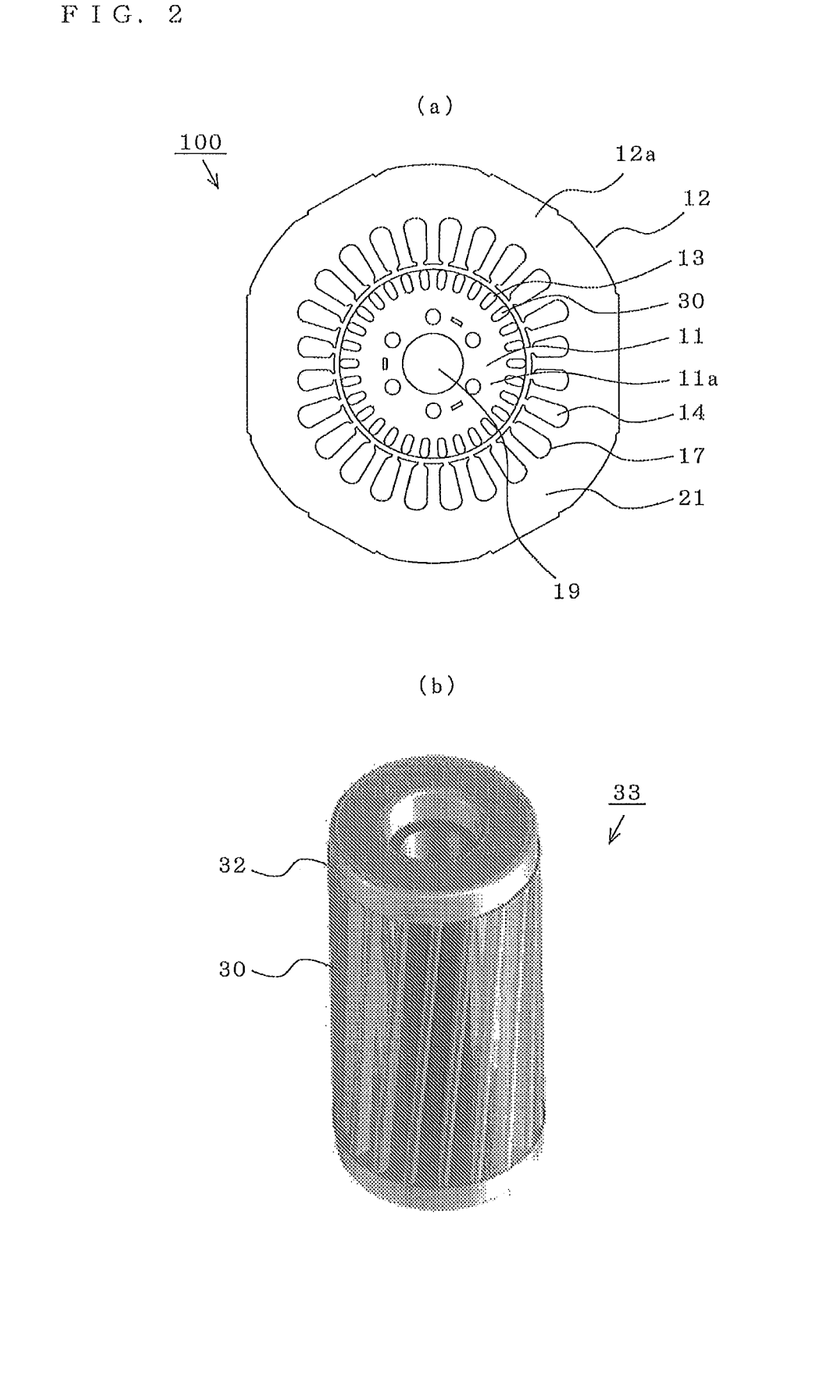
FIG. 2 is a transverse cross-sectional view of the induction motor shown in FIG. 1.
Figure 3:
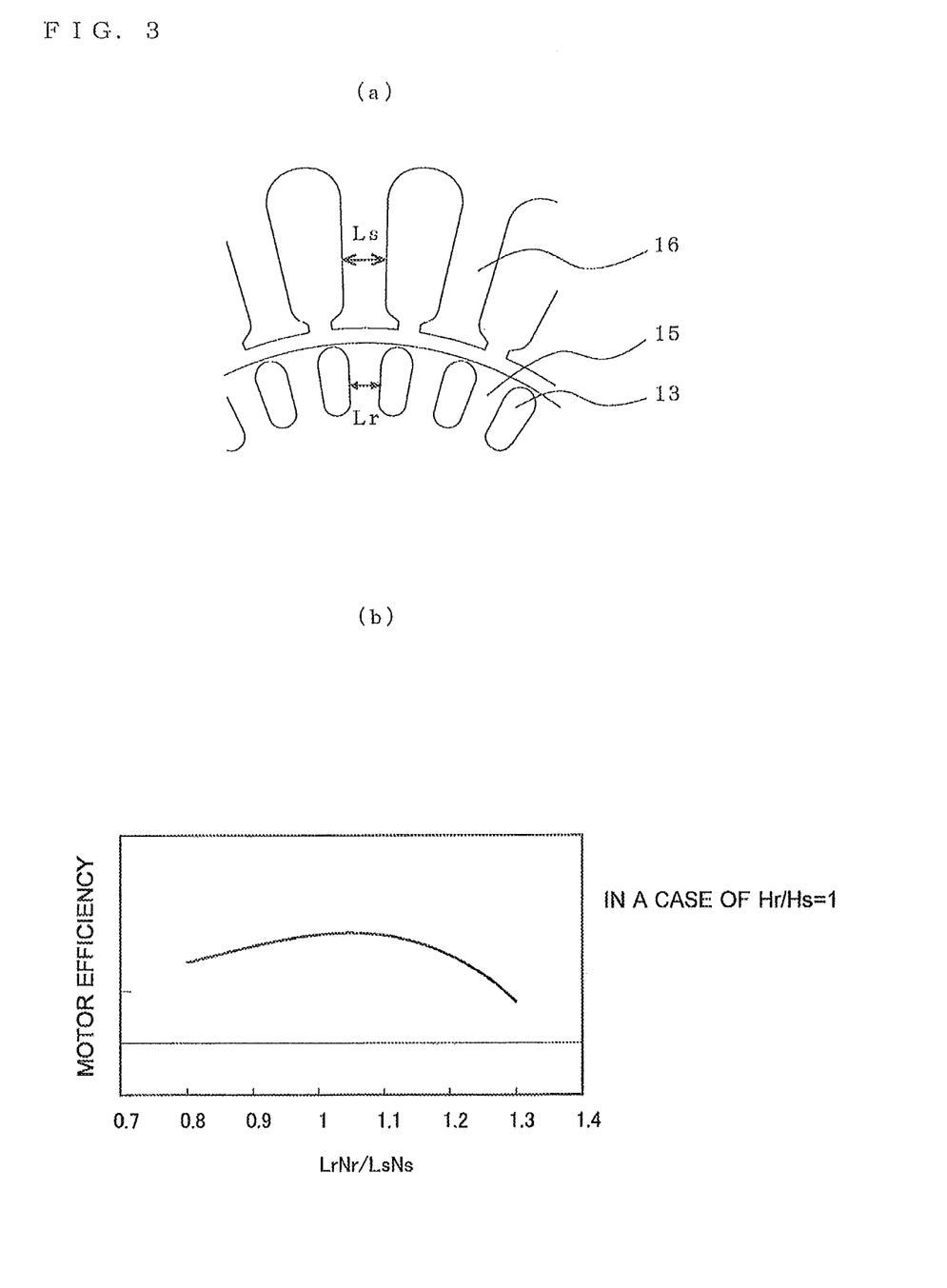
FIG. 3 is a partially enlarged plan view of the induction motor shown in FIG. 1.

FIG. 1 to FIG. 3 are views for explaining an induction motor according to Embodiment 1 of the present invention, wherein FIG. 1 is an axial cross-sectional view, FIG. 2 is a transverse cross-sectional view and FIG. 3 is a partially enlarged plan view of a stator core and a rotor core. The respective views are drawn schematically, and the present invention is not limited to a depicted mode (the number or amounts of respective parts, and relative size ratios and the like).

In FIG. 1, an induction motor 100 includes a stator 12, and a rotor 11 which is arranged inside the stator 12 with an air gap 20 formed therebetween.

(Stator)

In FIG. 2A, the stator 12 includes an approximately ring-shaped stator core 12a and stator coils 14 which are inserted into stator slots 17 formed in the stator core 12a. The stator coil 14 is a coil wound around each stator tooth 16 by concentration winding or distribution winding. Further, the stator coil 14 adopts a single phase or three phases. The stator core 12a has a ring-shaped core back 21 on an outer peripheral side thereof, and a plurality of stator teeth 16 extend radially in the direction toward the rotor 11 from an inner peripheral side of the core back 21 (in the direction toward the center of a rotary shaft not shown in the drawing). Although the stator 12 where the number of stator slots 17 is 24 is shown in FIG. 2, this stator 12 is merely an example and the number of slots is not limited to 24.

The stator slots 17 are formed in the stator core 12a along an inner periphery thereof. The stator slots 17 are arranged at approximately equal intervals in the circumferential direction. The stator slots 17 extend in the radial direction.

The stator slot 17 is opened at an inner periphery thereof, and this opening portion is referred to as a slot opening. The stator coil (equal to winding) 14 is inserted into the stator slot 17 through the slot opening.

A cutout which constitutes an approximately straight-line portion is formed on an outer peripheral surface of the stator core 12a at 4 positions by cutting out an outer peripheral circular shape into an approximately straight-line shape. With respect to the cutouts formed at 4 positions, neighboring cutouts are arranged at an approximately right angle. The number, a shape and the arrangement of approximately straight-line cutouts are not limited to a mode shown in the drawing.

The stator core 12a is manufactured by blanking a flat rolled magnetic steel sheet having a sheet thickness of 0.1 mm to 1.5 mm, for example, into a predetermined shape, stacking the blanked steel sheets in the axial direction, and fixing the blanked steel sheets to each other by caulking, welding or using an adhesive agent or the like.

(Rotor)

The rotor 11 includes a squirrel-cage-like secondary conductor 33 which is constituted of a rotor core 11a, aluminum bars 30 and a pair of end rings 32 which is formed on both sides of the core stacking direction (see FIG. 2B).

The aluminum bars 30 and the end rings 32 are simultaneously manufactured by casting aluminum using aluminum die-casting.

The squirrel-cage-type secondary conductor 33 may be formed using copper in place of aluminum.

The rotor core 11a has an approximately circular cross section, and a plurality of rotor slots 13 are formed in the rotor core 11a along an outer periphery of the rotor core 11a at approximately equal intervals in the circumferential direction. A rotor tooth 15 is formed between two neighboring rotor slots. Although the number of rotor slots is 30 in this embodiment, the number of rotor slots is not limited to 30 in the present invention.

A shaft hole 19 in which a drive shaft is fitted is formed in a center portion of the rotor core 11a.

The rotor core 11a is manufactured by blanking a flat rolled magnetic steel sheet having a sheet thickness of 0.1 mm to 1.5 mm, for example, into a predetermined shape, stacking the blanked steel sheets in the axial direction, and fixing the blanked steel sheets to each other by caulking or using an adhesive agent.

Since a nonmagnetic and conductive material is filled in the rotor slot 13, when a magnetic flux of the stator 12 cross-links the rotor slot 13, a secondary current is generated in the aluminum bar 30, and a torque is generated due to the secondary current and the magnetic flux of the stator 12.

The loss of induction motor 100 can be classified into primary copper loss, secondary copper loss and iron loss.

To lower secondary copper loss for driving the induction motor at high efficiency, it is preferable to make the rotary slot 13 large to increase the diameter of the aluminum bar 30 (iron loss being increased due to the magnetic flux saturation of the rotor 11).

Further, to decrease the iron loss, it is preferable to make the rotor tooth 15 large to prevent the magnetic flux saturation (making the slots small).

Accordingly, the rotary slots 13 are made large to lower the secondary copper loss and, at the same time, to prevent the magnetic flux saturation of the rotor tooth 15, a length of the rotor 11 in the rotary axis direction (hereinafter referred to as "rotor core width") Hr is set larger than a length of the stator 12 in the rotary axis direction (hereinafter referred to as "stator core width") Hs (see FIG. 1). That is, the induction motor 100 satisfies the following formula.

$$Hr > Hs \quad \text{(formula 1)}$$

Further, "a magnetic path width (Lr·Nr) of the rotor" which is the product of the circumferential width (Lr) of the rotor tooth 15 and the number (Nr) of the rotor teeth 15 is set equal to or more than "a magnetic path width (Ls·Ns) of the stator" which is the product of the circumferential width (Ls) of the stator tooth 16 and the number (Ns) of the stator teeth 16. That is, the induction motor 100 satisfies the following formula.

$$Lr \cdot Nr \geq Ls \cdot Ns \quad \text{(formula 2)}$$

Since the induction motor 100 satisfies the formula 2, a magnetic flux balance between the rotor 11 and the stator 12 is improved, and the magnetic flux saturation can be suppressed (see FIG. 3B).

[Embodiment 2: Induction Motor]

Figure 4:
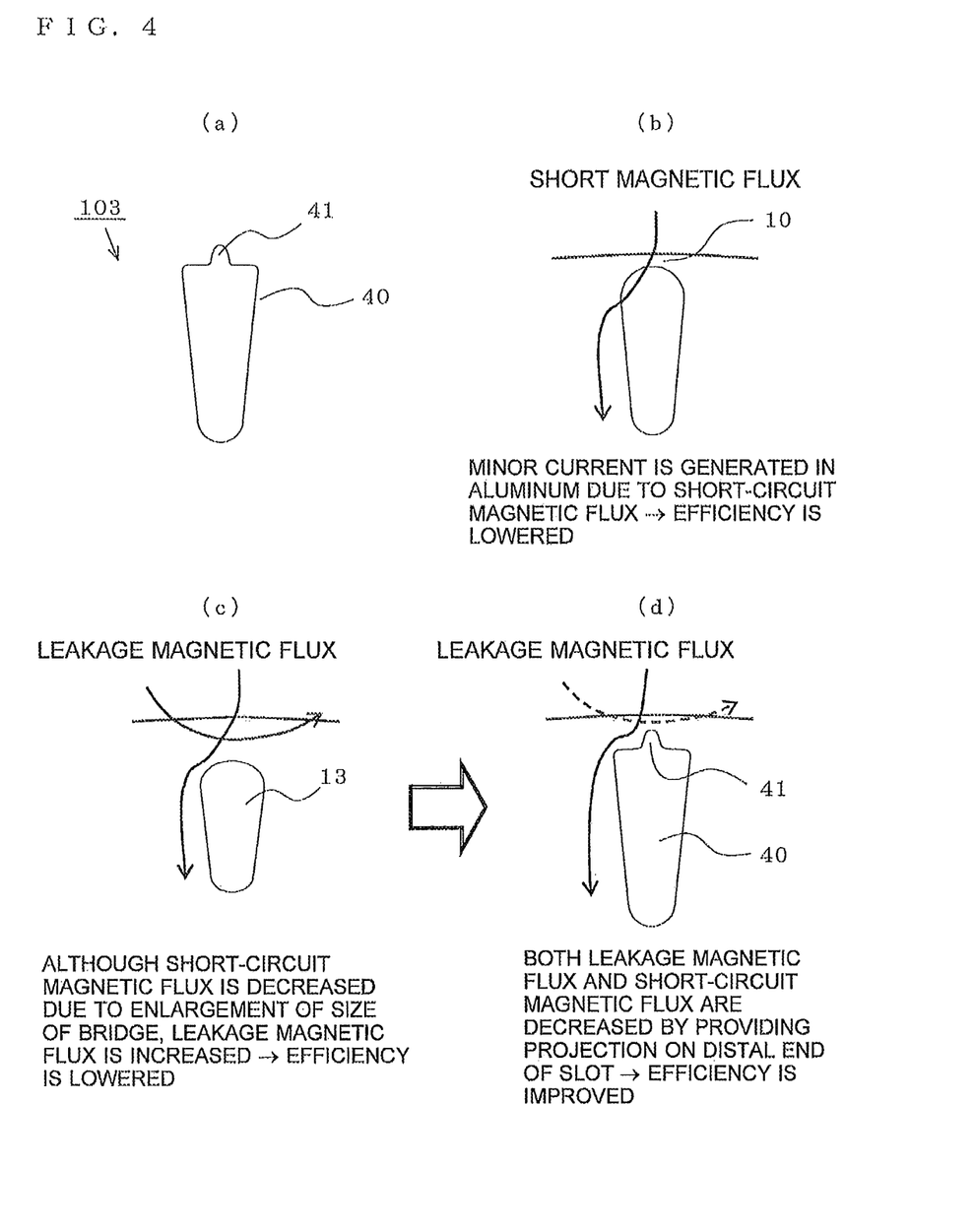
FIG. 4 is a partially enlarged plan view for explaining an induction motor according to Embodiment 2 of the present invention.

FIG. 4 is a partially enlarged plan view for explaining an induction motor according to Embodiment 2 of the present invention. The induction motor 103 is formed by changing a shape of the rotor slot 13 in the induction motor 100 (Embodiment 1). Parts other than the rotor slots 13 are equal to corresponding parts in Embodiment 1 and hence, the explanation of some parts is omitted.

In FIG. 4A, a rotor slot 40 is modified in shape by forming a projection 41 on an outer peripheral side of the rotor slot 13 in Embodiment 1.

In FIG. 4D, by forming the rotor slot 40 into a projecting shape having the projection 41, a stator magnetic flux smoothly enters the rotor tooth 15 and hence, a magnetic flux of the rotor tooth 15 becomes higher than a magnetic flux of the rotor tooth having a general arcuate shape (see FIG. 4B and FIG. 4C) which is not provided with the projection 41.

That is, when the rotor slot 40 has no projection and a bridge portion 10 is narrow as shown FIG. 4B, a minor current is generated in aluminum due to a short-circuit magnetic flux and hence, the efficiency of the induction motor is lowered. When the rotor slot 40 has no projection and the bridge portion 10 is enlarged as shown FIG. 4C, although a short-circuit magnetic flux is decreased, a leakage magnetic flux is increased so that the efficiency is lowered. On the other hand, when the projection 41 is formed on a distal end of the rotor slot 40 as shown in FIG. 4D, both the leakage magnetic flux and the short-circuit magnetic flux are decreased so that the efficiency of the induction motor is improved.

[Embodiment 3: Induction Motor]

Figure 5:
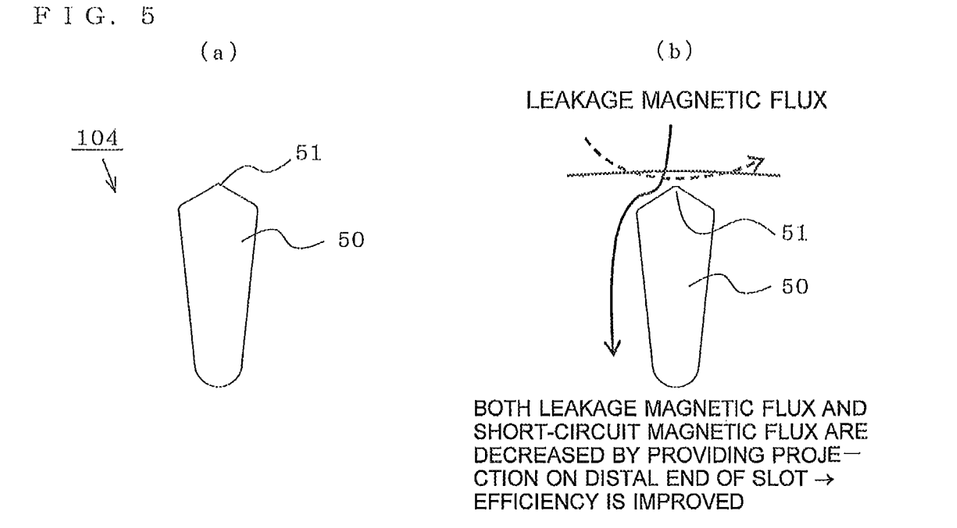
FIG. 5 is a partially enlarged plan view for explaining an induction motor according to Embodiment 3 of the present invention.

FIG. 5 is a partially enlarged plan view for explaining an induction motor according to Embodiment 3 of the present invention. The induction motor 104 is formed by changing a shape of the rotor slot 13 in the induction motor 100 (Embodiment 1). Parts other than the rotor slots 13 are identical with corresponding parts in Embodiment 1 and hence, the explanation of some parts is omitted.

In FIG. 5A, a rotor slot 50 is formed by modifying the rotor slot 13 in Embodiment 1 such that the rotor slot 50 is provided with a rhombic V-shaped distal end 51 whose outer peripheral side is formed into an approximately V shape. By forming the distal end 51 into a rhombic shape, a stator magnetic flux smoothly enters the rotor tooth 15 and hence, a magnetic flux of the rotor tooth 15 becomes higher than a magnetic flux of the rotor tooth having a generally arcuate shape (see FIG. 3).

Further, by forming a distal end of the rotor slot 50 into a V shape as shown in FIG. 5B, in the same manner as Embodiment 2, both the leakage magnetic flux and the short-circuit magnetic flux are decreased so that the efficiency of the induction motor is improved.

[Embodiment 4: Induction Motor]

Figure 6:
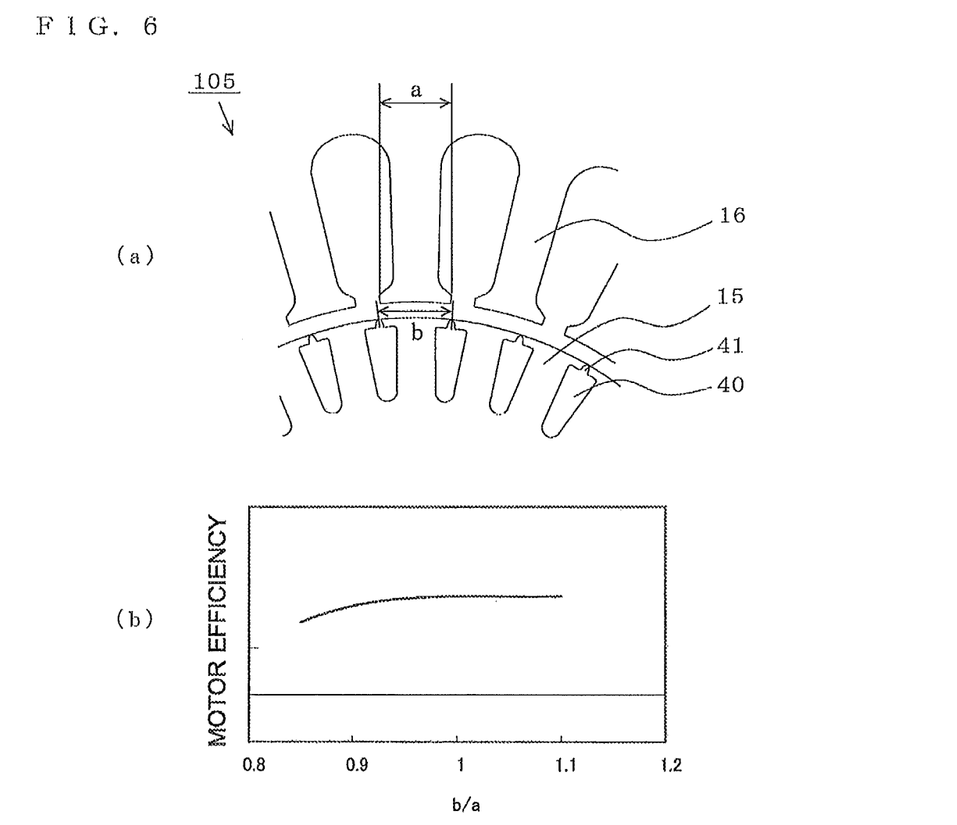
FIG. 6 is a partially enlarged plan view for explaining an induction motor according to Embodiment 4 of the present invention.

FIG. 6 is a partially enlarged plan view for explaining an induction motor according to Embodiment 4 of the present invention. Parts identical with or corresponding to parts in Embodiments 1, 2 are given same symbols and the explanation of some parts is omitted.

As shown in FIG. 6A, in an induction motor 105, a distance b between outer peripheral peaks (equal to projections 41) of the neighboring rotor slots 40 is set larger than a distal end width a of the stator tooth 16. That is, the induction motor 105 satisfies the following formula 3.

$$b > a \quad \text{(formula 3)}$$

Accordingly, the magnetic resistance can be decreased so that the efficiency of the induction motor can be improved (see FIG. 6B).

[Embodiment 5: Compressor]

Figure 7:
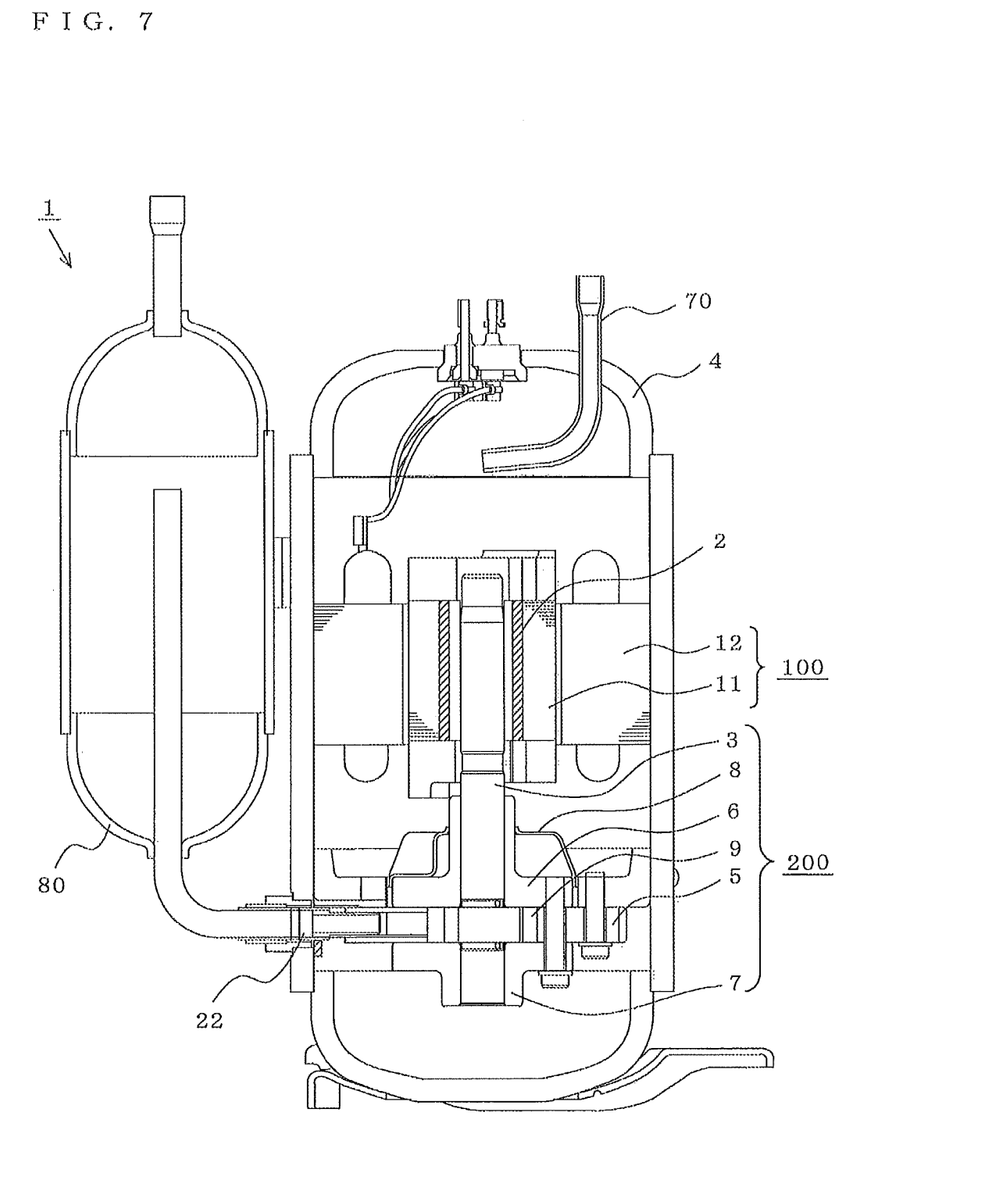
FIG. 7 is a partially enlarge plan view for explaining a compressor according to Embodiment 5 of the present invention.

FIG. 7 is a partially enlarged plan view for explaining a compressor according to Embodiment 5 of the present invention. Parts identical with or corresponding to parts in Embodiment 1 are given same symbols and the explanation of some parts is omitted.

The compressor 1 can be operated with high efficiency by using any one of the induction motors 100, 102 to 105 described in Embodiments 1 to 4 in the compressor 1 and hence, a rotary compressor (hereinafter referred to as "compressor") 1 which mounts the induction motor 100 thereon is explained.

In FIG. 7, the compressor 1 houses compression elements 200, the induction motor 100 which constitutes an electrically-operated element, and refrigerating machine oil not shown in the drawing in a sealed vessel 4.

The refrigerating machine oil is reserved in a bottom portion of the sealed vessel 4. The refrigerating machine oil mainly lubricates sliding parts of the compression elements 200.

The induction motor 100 includes the stator 12 and the rotor 11, a gas flow passage 2 is formed in the rotor 11, and a refrigerant or oil passes through the gas flow passage 2.

In general, to secure the performance of a sealed compressor (equal to the compressor 1), it is necessary to provide a flow passage for a constant amount of refrigerant to a motor (equal to the induction motor 100).

The compression elements 200 are constituted of a cylinder 5, an upper bearing 6 (one example of bearing), a lower bearing 7 (one example of bearing), a rotary shaft 3, a rolling piston 9, a discharge muffler 8, a vane (not shown in the drawing) and the like. Although the constitution of the compression elements 200 is equal to the constitution of corresponding compression elements of a general compressor except for the constitution of the rotary shaft 3, the compression elements are explained schematically hereinafter.

(Compression Element)

In the compression elements 200, the cylinder 5 in which a compression chamber is formed has an approximately circular outer periphery as viewed in a plan view, and has a cylinder chamber which is an approximately circular space as viewed in a plan view therein. The cylinder chamber has both ends thereof opened in the axial direction.

The cylinder 5 has a predetermined height in the axial direction as viewed in a side view. The cylinder 5 is communicated with the cylinder chamber which is an approximately circular space, and a parallel vane groove (not shown in the drawing) which extends in the radial direction is formed in the cylinder 5 in a penetrating manner in the axial direction. Further, on a back surface of the vane groove (outside), a back pressure chamber (not shown in the drawing) which is an approximately circular space as viewed in a plan view and is communicated with the vane groove is formed.

A suction port (not shown in the drawing) through which a suction gas from the refrigerating cycle passes is formed in the cylinder 5 in a penetrating manner from an outer peripheral surface of the cylinder 5 to the cylinder chamber.

A discharge port (not shown in the drawing) is formed in the cylinder 5 by cutting out a portion of the cylinder in the vicinity of a circular peripheral portion of the cylinder chamber which is an approximately circular space (an end surface of the cylinder 5 on an induction motor 100 side).

Further, a rolling piston 9 is eccentrically rotated in the inside of the cylinder chamber. The rolling piston 9 has a ring shape, and an inner periphery of the rolling piston 9 is slidably fitted on an eccentric shaft portion of the rotary shaft 3.

A vane is housed in the vane groove formed on the cylinder 5, and the vane is always pressed to the rolling piston 9 by a vane spring (not shown in the drawing) arranged in the back pressure chamber.

In the rotary compressor 1, the inside of the sealed vessel 4 is at a high pressure and hence, when an operation of the rotary compressor 1 is started, a force which is generated due to the differential pressure between a high pressure in the sealed vessel 4 and a pressure in the cylinder chamber acts on a back surface (a back pressure chamber side) of the vane. Accordingly, the vane spring is mainly used for pressing the vane to the rolling piston 9 at the time of starting the rotary compressor 1 (in a state where there is no difference between the pressure in the sealed vessel 4 and the pressure in the cylinder chamber). A shape of the vane is an approximately a flat rectangular parallelepiped shape (a thickness in the circumferential direction being set smaller than a length in the radial direction and a length in the axial direction).

The upper bearing 6 is slidably fitted on a main shaft portion (a portion above the eccentric shaft portion) of the rotary shaft 3 and closes one end surface (an induction motor 100 side) of the cylinder chamber (including the vane groove) of the cylinder 5. A high-temperature and high-pressure discharged gas which is discharged from a discharge valve of the upper bearing 6 temporarily enters the discharge muffler 8 and, thereafter, is discharged into the inside of the sealed vessel 4 from a discharge hole (not shown in the drawing) formed in the discharge muffler 8.

The lower bearing 7 is slidably fitted on a sub shaft portion (a portion below the eccentric shaft portion) of the rotary shaft 3, and closes the other end surface (refrigerating machine oil side) of the cylinder chamber (including the vane groove) of the cylinder 5. The lower bearing 7 has an approximately T shape as viewed in a side view. The discharge muffler 8 is mounted on an outer side (an induction motor 100 side) of the upper bearing 6.

A suction muffler 80 which sucks a low-pressure refrigerant gas from a refrigerating cycle and suppresses the direction suction of a liquid refrigerant into the cylinder chamber of the cylinder 5 when the liquid refrigerant returns to the cylinder 5 is arranged on a lateral side of the sealed vessel 4. The suction muffler 80 is connected to the suction port of the cylinder 5 by way of a suction pipe 22. The suction muffler 80 is fixed to a side surface of the sealed vessel 4 by welding or the like.

A high-temperature and high-pressure gas refrigerant which is compressed by the compression elements 200 passes through the induction motor 100 after being discharged from a discharge hole (not shown in the drawing) of the discharge muffler 8 and is discharged to an outside refrigerant circuit (not shown in the drawing) from a discharge pipe 70.

When the induction motor 100 having the stator 12 is used in the rotary compressor 1, the stator 12 is mounted on a body portion of the cylindrical sealed vessel 4 of the rotary compressor 1 by shrinkage fitting.

Between the body portion of the sealed vessel 4 and each cutout, provided is an oil return passage for returning refrigerating oil which passes through the gas flow passage 2 formed in the rotor 11, is discharged to a space above the electrically-operated element 100 together with a gas refrigerant, and is separated from the gas refrigerant by an oil separator not shown in the drawing to a bottom portion of the sealed vessel 4.

The rotor core 11a has a shaft hole having a circular cross section near the center thereof. The rotor shaft 3 is fixed to the shaft hole by shrinkage fitting or the like.

The single-phase induction motor 100 (see FIG. 2) which constitutes an electrically operated element adopts the combination of the stator core 12a and the rotor core 11a where the number of slots formed in the stator core 12a is 24 and the number of slots formed in the rotor core 11a is 30. However, this combination is merely one example, and the respective numbers of slots are not limited to 24 and 30.

In the squirrel-cage-type induction motor, the combination of the number of slots formed in a stator core and the number of slots formed in a rotor core is closely related to a synchronous torque, an asynchronous torque, an abnormal phenomenon such as vibrations and noises. Accordingly, the combination of the number of slots formed in the stator core and the number of slots formed in the rotor core is selected carefully.

[Embodiment 6: Refrigerating Cycle Apparatus]

Figure 8:
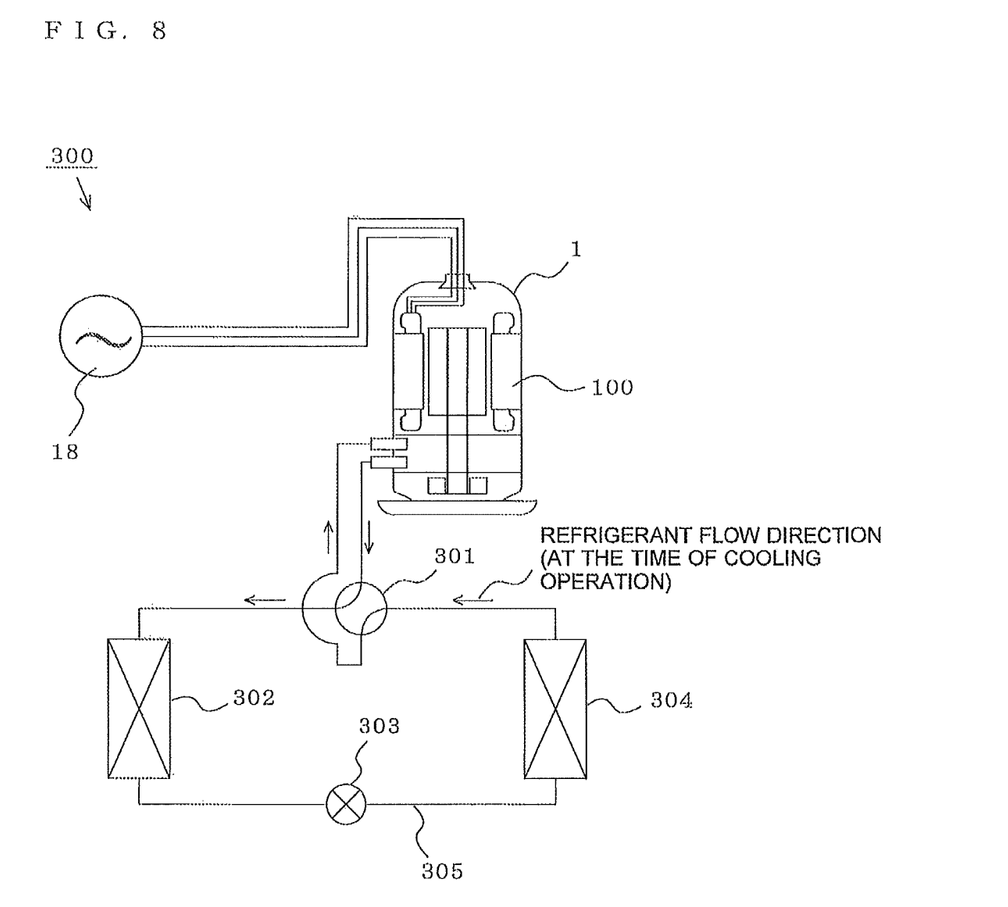
FIG. 8 is a constitutional view for explaining a refrigerating cycle apparatus according to Embodiment 6 of the present invention.

FIG. 8 is a constitutional view for explaining a refrigerating cycle apparatus according to Embodiment 6 of the present invention. Here, parts identical with or corresponding to parts in Embodiments 1, 5 are given same symbols and the explanation of some parts is omitted.

In FIG. 8, a refrigerating cycle apparatus 300 is mounted on an air conditioner, for example. The refrigerating cycle apparatus 300 includes the rotary compressor 1 (Embodiment 1) as a constitutional element thereof.

That is, the rotary compressor 1 is connected to a power source 18, and a drive capacitor is connected between an auxiliary winding (not shown in the drawing) of the single-phase induction motor 100 of the rotary compressor 1 and the power source 18. Electricity is supplied to the rotary compressor 1 from the power source 18 so that the rotary compressor 1 is driven.

The refrigerating cycle apparatus (air conditioner) is constituted of the rotary compressor 1, a four-way valve 301 which changes over the direction along which a refrigerant flows, an outdoor heat exchanger 302, a pressure reducing device 303, an indoor heat exchanger 304, a refrigerant pipe 305 which connects the above-mentioned elements and circulates the refrigerant therethrough, and the like.

In the refrigerating cycle apparatus (equal to the air conditioner) 300, at the time of performing a cooling operation, for example, a refrigerant flows as indicated by arrows in FIG. 8 so that the outdoor heat exchanger 302 functions as a condenser, and the indoor heat exchanger 304 functions as an evaporator.

On the other hand, in the refrigerating cycle apparatus (equal to the air conditioner) 300, at the time of performing a heating operation, the direction along which the refrigerant flows is changed over by the four-way valve. That is, the refrigerant flows in the direction opposite to the direction along which the refrigerant flows at the time of performing the cooling operation (the direction indicated by the arrow in FIG. 8) so that the outdoor heat exchanger functions as an evaporator, and the indoor heat exchanger functions as a condenser.

Further, as the refrigerant, an HFC-based refrigerant represented by R134a, R410a, R407c or the like is used. Further, a natural refrigerant represented by R744 (CO2), R717 (ammonia), R600a (isobutane), R290 (propane) or the like is used.

As the refrigerating machine oil, weak compatible oil represented by alkylbenzene-based oil is used. Further, compatible oil represented by ester oil is used.

With the use of the compressor 1 which mounts the induction motor 100 thereon in the refrigerating cycle apparatus 300, the enhancement of performance, the miniaturization, and the reduction of cost of the refrigerating cycle apparatus 300 can be realized.

[Industrial Applicability]

The induction motor according to the present invention can improve efficiency thereof and hence, the induction motor can be also mounted on a reciprocating-type compressor, a scroll-type compressor or the like and, further, such a compressor can be mounted on various kinds of refrigerating cycle apparatuses.

[Reference Signs List]

1: rotary compressor, 2: gas flow passage, 3: rotary shaft, 4: sealed vessel, 5: cylinder, 6: upper bearing, 7: lower bearing, 8: discharge muffler, 9: rolling piston, 10: bridge portion, 11: rotor, 11a: rotor core, 12: stator, 12a: stator core, 13: rotor slot, 14: stator coil, 15: rotor teeth, 16: stator teeth, 17: stator slot, 18: power source, 19: shaft hole, 20: gap, 21: core back, 22: suction pipe, 30: aluminum bar, 32: end ring, 40: rotor slot (Embodiment 3), 41: projection, 50: rotor slot (Embodiment 4), 51: V-shaped distal end, 70: discharge pipe, 80: suction muffler, 100: induction motor (electrically-operated element), 103: induction motor (Embodiment 2), 104: induction motor (Embodiment 3), 105: induction motor (Embodiment 4), 200: compression element, 300: refrigerating cycle apparatus (Embodiment 6), 301: four-way valve, 302: outdoor heat exchanger, 303: pressure reducing device, 304: indoor heat exchanger, 305: refrigerant pipe,

What is claimed is:

1. An induction motor comprising:
a rotor, which is a squirrel-cage-type secondary conductor, formed by filling a nonmagnetic and conductive material in the inside of rotor slots each having a taper-shaped projection in a center portion of an outer peripheral side of the rotor slot, said projection extending toward the outer periphery of the rotor; and
a stator which surrounds the rotor and is provided with a stator core having a stator tooth around which a winding is wound, wherein
a magnetic path width of the rotor is equal to or larger than a magnetic path width of the stator, where the magnetic path width of the rotor is a product of a circumferential width of a rotor tooth formed in the rotor and a number of rotor teeth and the magnetic path width of the stator is a product of a circumferential width of the stator tooth formed in the stator and a number of stator teeth,
a distal end of the projection and an outer periphery of the rotor are separated, and
a distance between distal ends of the projections of neighboring slots is larger than a width of the distal end of the stator tooth.

2. A compressor comprising:
a sealed vessel;
the induction motor according to claim 1 which is housed in the sealed vessel; and
compression elements housed in the sealed vessel, which are rotatably driven by the induction motor.

3. A refrigerating cycle apparatus comprising:
the compressor according to claim 2;
a condenser;
a throttle device;
an evaporator; and
a refrigerant pipe which connects the compressor, the condenser; the throttle device, and the evaporator.

* * * * *